July 10, 1962  J. W. HORNER  3,043,465
TANK
Filed Oct. 28, 1959  2 Sheets-Sheet 1
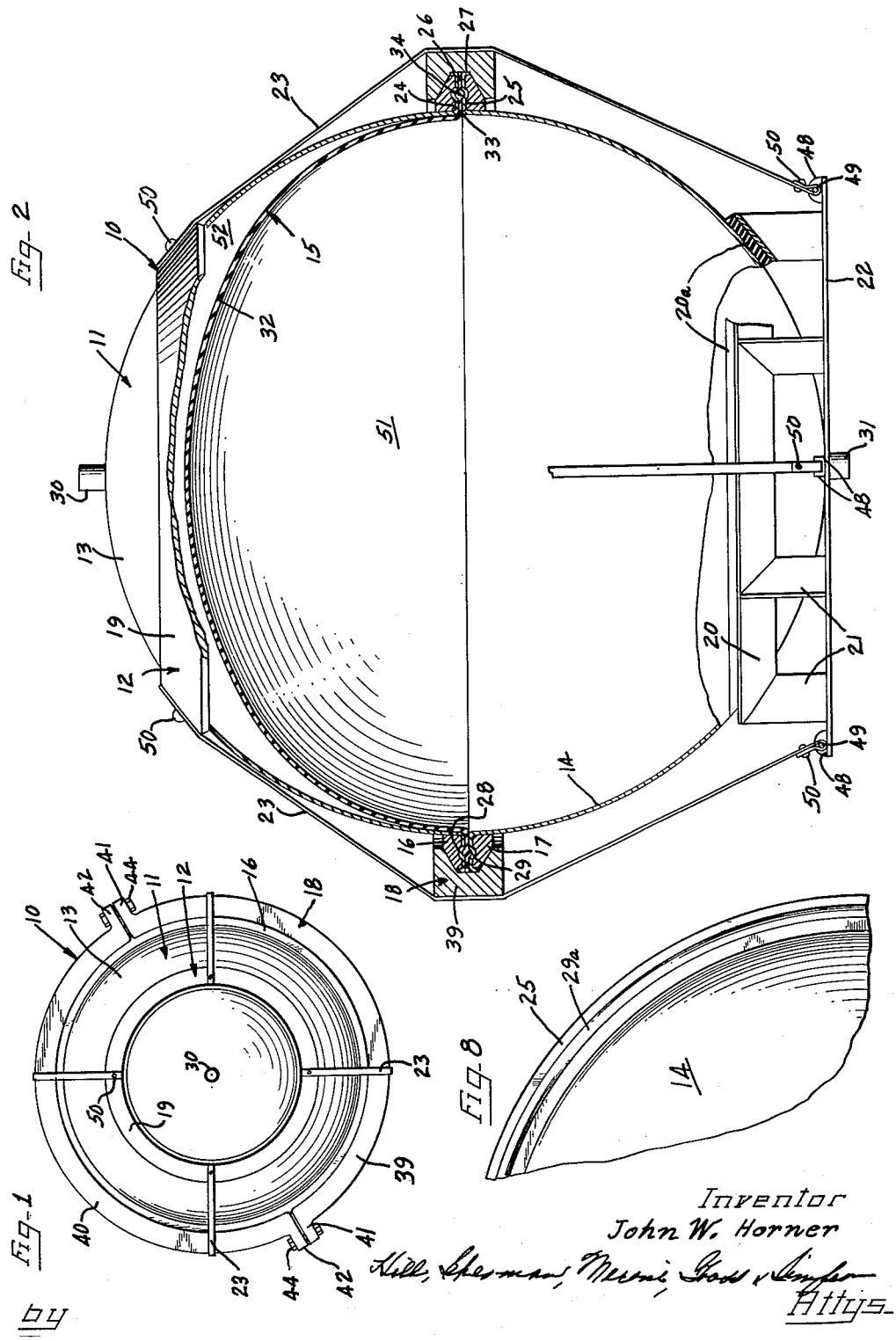
Inventor
John W. Horner
Hill, Sherman, Meroni, Gross & Simpson
Attys.

July 10, 1962    J. W. HORNER    3,043,465
TANK
Filed Oct. 28, 1959    2 Sheets-Sheet 2
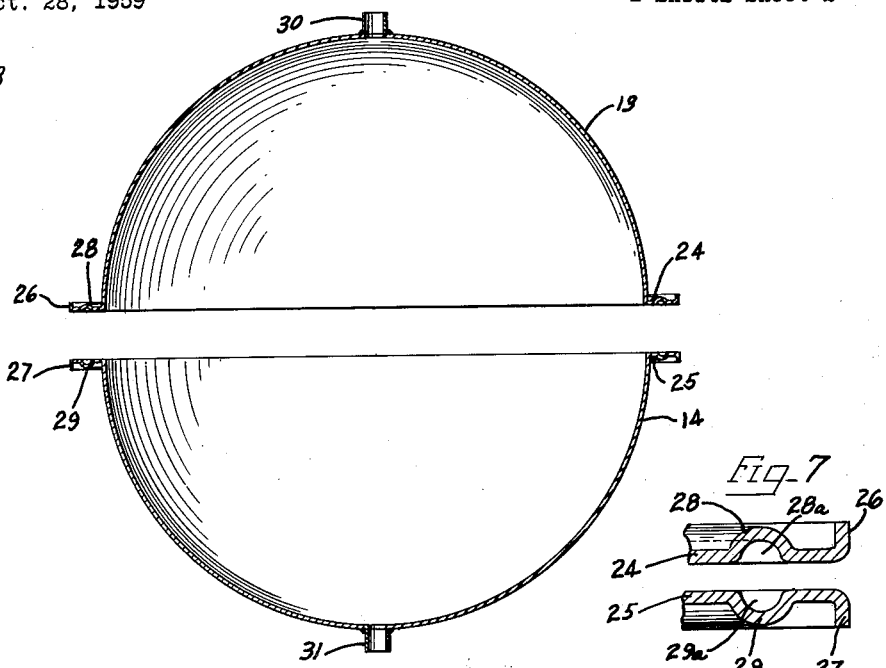
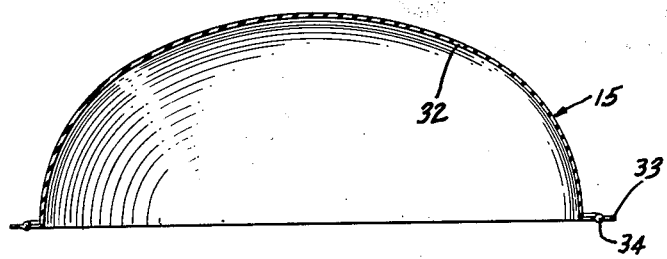
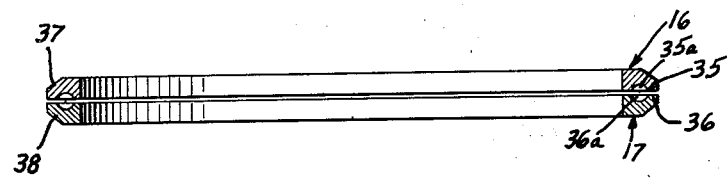
Inventor
John W. Horner
by Hill, Sherman, Meroni, Gross & Simpson    Attys.

United States Patent Office 3,043,465
Patented July 10, 1962

1

3,043,465
TANK
John W. Horner, Whittier, Calif., assignor to Thompson Ramo Wooldridge Inc., Cleveland, Ohio, a corporation of Ohio
Filed Oct. 28, 1959, Ser. No. 849,364
2 Claims. (Cl. 220—5)

This invention relates to a tank construction and mounting which is especially useful to furnish fuel or oxidizer to rocket engines. Specifically this invention deals with a spherical expulsion type tank which is inexpensive, easy to manufacture, light in weight, and exceptionally strong.

In accordance with this inventoin there is provided a spherical container composed of two externally flanged metal hemispheres, an externally flanged hemispherical flexible diaphragm, and a ring assembly coacting with the flanges to secure the metal hemispheres together in opposed relation while clamping the diaphragm flange therebetween. The metal hemispheres are easily formed by die pressing, spinning, or drawing thin sheet metal such as, aluminum or an alloy steel, capable of resisting the contemplated contents of the container. The diaphragm is composed of an impervious pliable sheet material such as natural or synthetic rubber, plastic such as Teflon or nylon or the like material, capable of resisting the contemplated contents of the container. The ring assembly may be composed of any metal such as, for example, aluminum or steel. The tank mounting includes a pair of opposed rings forming seats for the spherical tank and metal straps binding the seat rings together in opposed relation and embracing the clamping ring assembly.

A feature of this invention is the provision of grooves in the flanges of the metal hemispheres and the provision of a bead on the flange of the diaphragm for fitting in the grooves to enhance the sealing and gripping of the diaphragm around its periphery.

It is then an object of this invention to provide a lightweight spherical tank assembly especially adapted for use in rockets.

Another object of this invention is to provide an inexpensive, strong, lightweight spherical tank composed of clamped together externally flanged hemispheres and an expulsion bag spanning the interior of the tank and sealed between the flanges of the hemisphere.

A still further object of this invention is to provide a fuel or oxidizer tank for rockets which is light in weight, inexpensive to manufacture, and equipped with an expulsion bag.

A still further object of this invention is to provide a fuel tank and mounting assembly wherein a pair of clamped together metal members are seated in opposed seating rings held by external straps.

A still further object of this invention is to provide an expulsion type tank composed of a pair of opposed half casing parts locked together by a clamping ring assembly and mounted in opposed seat rings held by straps.

Other and further objects of the invention will be apparent to those skilled in this art from the following detail description of the annexed sheets of drawings which, by way of a preferred example only illustrate one embodiment of the invention.

On the drawings:
FIGURE 1 is a top plan view of the tank and mounting assembly of this invention;
FIGURE 2 is a side elevational view, with parts in vertical cross section, of the tank and mounting assembly of FIG. 1;
FIGURE 3 is a vertical cross sectional view of the opposed hemispherical casing parts for the tank of this invention;

2

FIGURE 4 is a vertical cross sectional view of the diaphragm for the tank;
FIGURE 5 is a vertical cross sectional view of the flange rings for the tank;
FIGURE 6 is an inside elevational view of one of the clamping rings for the tank;
FIGURE 7 is a fragmentary enlarged cross sectional detail view of the opposed flanges of the tank casing parts; and
FIGURE 8 is a fragmentary plan view of a portion of the periphery of one of the casing parts of the tank.

As shown on the drawings:
The assembly 10 of FIGS. 1 and 2 includes a spherical tank 11 and a tank mounting 12.

The tank 11 is composed of a pair of opposed externally flanged metal hemispheres 13 and 14, an externally flanged generally hemispherically shaped internal diaphragm 15, opposed flange rings 16 and 17 and a clamping ring 18.

The mounting 12 is composed of a pair of opposed metal seat rings 19 and 20, a plurality of legs 21 depending from the ring 20 and carried by a flat base ring 22, and a plurality of metal straps 23 uniting the ring 19 with the base ring 22 and embracing the clamping ring 18. If desired the ring 20 can be lined with resilient cushion material 20a to gently cradle the tank.

As shown in FIGS. 2 and 3, the metal hemispheres 13 and 14 have outturned flanges 24 and 25, respectively, extending radially outward from the major diameter thereof. These flanges, as best shown in FIG. 7, have peripheral skirts 26 and 27, respectively. These flange skirts extend away from each other and provide peripheral walls for the flanges. The flanges 24 and 25 have annular beads or embossments 28 and 29, respectively, therearound about midway between the external skirt or peripheral wall thereof and the adjacent wall of the hemisphere. These embossments provide semicircular annular recesses 28a and 29a which, when aligned, will provide a circular groove of circular cross section between the flanges.

The casing parts 13 and 14 are apertured at the pole portions thereof and have externally projecting tubular fittings 30 and 31, respectively. These fittings receive conduit tubes (not shown).

The diaphragm 15, as shown in FIGS. 2 and 4, is composed of a generally hemispherical shaped main body portion 32 with an outturned flat flange 33 around the major diameter thereof. This flange 33 has a raised bead 34 of circular cross section about midway between the inner and outer peripheries of the flange and extending completely around the flange on both sides thereof. As shown in FIG. 2, the flange 33 is seated between the casing flanges 24 and 25 with the bead 34 thereof seated in the annular groove provided by the embossments 28 and 29 of the casing flanges. The diaphragm flange 33 terminates inside of the peripheries of the casing flanges so as not to form a protruding obstruction.

As shown in FIGS. 2 and 5, the flange rings 16 and 17 have an inner diameter to snugly embrace the casing parts 13 and 14, respectively, at the major diameters of these parts. The outer peripheries of the flange rings are sized for fitting inside of the skirts 26 and 27 of the flanges. The flange rings have flat faces 35 and 36, respectively, with annular semi-circular grooves 35a and 36a, respectively. The flat faces engage the flanges 24 and 25, respectively, while the grooves 35a and 36a receive the embossments of these flanges.

The rings 16 and 17 have inclined or beveled peripheral walls 37 and 38, respectively. These beveled walls diverge from the skirts 26 and 27 when the rings are seated on the hemisphere flanges 24 and 25, as shown in FIG. 2.

As shown in FIG. 1, the clamping ring 18 is composed of a pair of semi-circular metal rings 39 and 40 equipped with outturned ears 41 and 42, respectively, at the ends thereof. These ears have bolt holes 43 therethrough (FIG. 6) and draw bolts 44 in these holes serve to draw the opposed rings 39 and 40 toward each other.

Each ring 39 and 40, such as the illustrated ring 39 of FIG. 6, has an internal frusto conical groove 45 therearound. This groove is deep enough to embrace the skirts 26 and 27 of the hemisphere flanges 24 and 25 and has a first inclined side wall 46 for engaging the beveled peripheral wall 37 of the flange ring 16 and a second inclined side wall 47 for engaging the beveled peripheral wall 38 of the flange ring 17. When the clamping ring halves 39 and 40 are seated around the flanges 24 and 25, these inclined sides 46 and 47 of their grooves 45 will wedgedly embrace the beveled walls of the flange rings 16 and 17 so that when the draw bolts 44 are tightened, the casing halves 13 and 14 will be secured together and the flange of the diaphrgam 15 will be securely clamped and locked between the casing flanges. The arrangement is such that a circumferential contraction of the clamping ring assembly 18 produces, through the wedging action of the inclined sides of the groove on the bevel peripheries of the flange rings 16 and 17, a forcing of the flange rings axially toward each other and thereby clamping the diaphragm flange between the casing flanges. At the same time the resulting spherical tank is reinforced against radial outward expansion around the equator thereof.

As shown in FIGS. 1 and 2, the seat rings 19 and 20 of the mounting assembly 12 are sized to embrace the spherical container 11 adjacent the poles thereof. These rings are spherically curved to form seating bands of appreciable width snugly receiving the spherical tank without imparting localized bending stresses to the tank walls.

The legs 21 of the ring 20 are spaced equally distant around the external face of the ring and extend perpendicularly between the ring 20 and the flat base ring 22. As shown in FIG. 2, the base ring 22 projects beyond the legs 21 and has pairs of ears 48 carrying pins 49 around which the ends of the straps 23 are turned. Rivets 50 secure the strap ends to the margin of the strap for forming loops to receive these pins 49. The opposite ends of the straps 23 are secured to the ring 19 also by rivets 50.

As shown in FIG. 1, four straps 23 connect the seat ring 19 with the base ring 22 and each of these straps embraces the clamping ring assembly 18.

The base ring 22 of course receives the tubular fitting 31 freely through the center thereof and this ring can be mounted as desired in the rocket.

The interior 51 of the tank 11 under the diaphragm 15 is filled with fuel, oxidizer, or the like material to be dispensed through the outlet tube 31. In rocket motor installations for example this main interior 51 can be filled with a rocket fuel such as hydrazine or with a rocket fuel oxidizer such as red fuming nitric acid. The space 52 between the diaphragm 15 and the top tube 30 of the tank is adapted to receive a fluid such as nitrogen gas to force the main body 32 of the diaphragm into the main tank space 51 and expel the contents of this space 51 through the outlet tube 31. The diaphragm actuating fluid is introduced into the space 52 through the fitting 30.

In its fully charged condition the main body 32 of the diaphragm will lie closely adjacent the wall of the top casing half 13 and the space 52 will be negligible. Then when the propelling fluid is introduced into the space 52 through the tube fitting 30, the main body 32 of the diaphragm will be forced away from the casing wall and downwardly into the space 51 toward the outlet fitting 31. When the tank is completely exhausted the space 51 under the diaphragm will be nil and the space 52 above the diaphragm will occupy most of the interior of the tank. In the exhausted position the diaphragm body 32 will lie closely adjacent the bottom casing half 14.

The beaded clamped periphery of the diaphragm 15 is so firmly held between the casing flanges that the diaphragm cannot pull away from the casing at the equator of the tank and the spaces 51 and 52 on opposite sides of the diaphragm will always remain in sealed apart relation.

From the above description it will be understood that this invention provides a very rigid lightweight expulsion type tank which is easy to manufacture and assemble. The invention also provides an inexpensive tank mounting which will securely hold the tank in position without imparting stresses thereto.

I claim as my invention:

1. A tank and tank mounting assembly which comprises a pair of opposed hemispherical casing halves each having out-turned flanges around the peripheries thereof, a diaphragm spanning the opposed casing halves and having a peripheral flange between the flanges of the casing halves, a clamping ring assembly embracing the flanges of the casing halves and drawing the flanges together in clamped relation to unite the casing halves and to seal the periphery of the diaphragm relative to the casing halves, said clamping ring assembly having means for exerting axial clamping pressure on the flanges of the casing and the periphery of the diaphragm in response to inward radial force thereon, a pair of opposed seat rings embracing and bottomed upon the clamped together casing halves on opposite sides of the clamping ring assembly, straps anchored to and extending between the opposed heat rings and embracing the casing halves and clamping ring assembly and extending transversely across the clamping ring assembly, said straps being anchored to said heating rings along a smaller circumference than the circumference of said clamping ring assembly, wherein the straps diverge outwardly from the seating rings toward said clamping ring assembly and operate under tension to hold the seating rings and clamping ring assembly in operative position.

2. A tank and tank mounting assembly which comprises a pair of opposed hemispherical casing halves each having out-turned flanges around the peripheries thereof, a diaphragm spanning the opposed casing halves and having a pheripheral flange between the flanges of the casing halves, a clamping ring assembly embracing the flanges of the casing halves and drawing the flanges together in clamped relation to unite the casing halves and to seal the periphery of the diaphragm relative to the casing halves, said clamping ring assembly having means for exerting axial clamping pressure on the flanges of the casing and the periphery of the diaphragm in response to inward radial force thereon, a pair of opposed seating rings embracing and bottomed upon the clamped together casing halves on opposite sides of the clamping ring assembly, one of said seat rings having a base associated therewith adapted to be mounted on supporting structure for the tank, straps anchored at one end to the base of said one seat ring and at the other end to the other seat ring and extending between the opposed seat rings and embracing the casing halves and clamping ring assembly and extending transversely across the clamping ring assembly, said straps being anchored to said seating ring and said base along a smaller circumference than the circumference of said clamping ring assembly, wherein the straps diverge outwardly from said base and said seating ring toward said clamping ring assembly and operate under tension to hold the seating rings and clamping ring assembly in operative position.

References Cited in the file of this patent

UNITED STATES PATENTS 1,092,999     Kinnear _____ Apr. 14, 1914

(Other references on following page)

UNITED STATES PATENTS

| | | |
|---|---|---|
| 1,376,216 | Mittinger | Apr. 26, 1921 |
| 1,398,298 | Irvin | Nov. 29, 1921 |
| 2,116,576 | Hormann | May 10, 1938 |
| 2,290,903 | Ansel | July 28, 1942 |
| 2,324,701 | Herman | July 20, 1943 |
| 2,628,673 | Ericson | Feb. 17, 1953 |
| 2,655,337 | Diesfeld | Oct. 13, 1953 |
| 2,685,889 | Leighton | Aug. 10, 1954 |
| 2,761,707 | Herman | Sept. 4, 1956 |